(12) United States Patent
Biggs et al.

(10) Patent No.: US 6,353,073 B1
(45) Date of Patent: Mar. 5, 2002

(54) POLY(AMINOORGANOFUNCTIONALDISILOXANES)

(75) Inventors: Timothy N. Biggs, Gainesville, FL (US); Benigno A. Janeiro, Burlington, NJ (US)

(73) Assignee: Archimica (Florida), Inc., Gainesville, FL (US)

( * ) Notice: Subject to any disclaimer, the term of this patent is extended or adjusted under 35 U.S.C. 154(b) by 0 days.

(21) Appl. No.: 09/532,715

(22) Filed: Mar. 22, 2000

(51) Int. Cl.$^7$ .......................... C08G 77/08; C08G 77/26
(52) U.S. Cl. ............................. 528/14; 528/12; 528/21; 528/23; 528/33; 528/37; 528/38; 556/413; 556/425; 556/466; 556/467
(58) Field of Search ............................. 528/12, 14, 21, 528/23, 33, 37, 38; 556/413, 425, 466, 467

(56) References Cited

U.S. PATENT DOCUMENTS

| | | | |
|---|---|---|---|
| 2,947,771 A | * 8/1960 | Bailey | |
| 3,775,452 A | 11/1973 | Karstedt et al. | 260/429 |
| 3,814,730 A | 6/1974 | Karstedt et al. | 260/46.5 |
| 4,680,366 A | * 7/1987 | Tanaka et al. | 528/27 |
| 4,736,049 A | 4/1988 | Suzuki et al. | 556/479 |
| 4,897,501 A | * 1/1990 | Takatsuna et al. | 556/413 |
| 4,921,988 A | * 5/1990 | Takatsuna et al. | 556/413 |
| 4,927,953 A | * 5/1990 | Takatsuna et al. | 556/413 |
| 5,026,890 A | 6/1991 | Webb et al. | 556/408 |
| 5,077,421 A | * 12/1991 | Selvig | 556/425 |
| 5,391,675 A | 2/1995 | Cray et al. | 528/14 |
| 5,486,634 A | 1/1996 | Hahn et al. | 556/425 |
| 5,892,084 A | 4/1999 | Janeiro et al. | 556/425 |

FOREIGN PATENT DOCUMENTS

| | | | |
|---|---|---|---|
| DE | 2408480 | 9/1975 | C07F/7/18 |
| EP | 0321174 | 6/1989 | C07F/7/08 |
| GB | 2185984 | 8/1987 | C07F/7/10 |
| JP | 11209384 | 8/1999 | |

\* cited by examiner

*Primary Examiner*—Robert Dawson
*Assistant Examiner*—Jeffrey B. Robertson
(74) *Attorney, Agent, or Firm*—Hedman & Costigan, P.C.

(57) ABSTRACT

The present invention provides near quantitative yields of greater than about 95% isomeric purity of poly(3-aminopropylmethylsiloxane)-poly(dimethylsiloxane) copolymers of the general formulae:

wherein Me is methyl, w may range from 1 to about 100, x may range from 1 to about 100, y may range from 1 to about 6, z may range from 1 to about 6 and y+z may range from 3 to about 7.

The present invention also provides a simple method for rapidly producing poly(3-aminopropylmethylsiloxane)-poly(dimethylsiloxane) copolymers of the general formulae:

wherein Me is methyl, w may range from 1 to about 100, x may range from 1 to about 100, y may range from 1 to about 6, z may range from 1 to about 6, and y+z may range from 3 to about 7, the method comprising heating of poly(3-aminopropylmethylsiloxane) of at least 95% isomeric purity, a cyclodimethylsiloxane with a basic catalyst, and destroying the catalyst when the copolymerization reaction is complete.

19 Claims, No Drawings

POLY(AMINOORGANOFUNCTIONALDISILOXANES)

FIELD OF THE INVENTION

The present invention relates to high purity poly(3-aminopropylmethylsiloxane)-poly(dimethylsiloxane) copolymers and a method for their preparation. More specifically, the present invention relates to more than 95% isomerically pure poly(3-aminopropylmethylsiloxane)-poly(dimethylsiloxane) copolymer fluids, both linear and cyclic, prepared by the base catalyzed polymerization and ring-chain equilibration of a mixture of at least 95% isomerically pure poly(3-aminopropylmethylsiloxanes) and dimethylcyclosiloxanes. These poly(3-aminopropylmethylsiloxane)-poly(dimethylsiloxane) copolymers have utility as intermediates for other derivative poly(organofunctionalsiloxanes) and in cosmetic, textile, and automotive applications, and as coatings and adhesives.

BACKGROUND OF THE PRESENT INVENTION

There is considerable prior art relating to the synthesis of poly(aminoalkylmethylsiloxanes). Generally, poly(aminoalkyl-methylsiloxanes) have been produced by first preparing aminoalkylmethyldialkoxysilanes, followed by hydrolysis with or without an endblocking agent, such as a trimethylsilyl derivative, forming cyclic and linear poly(3-aminoalkylmethylsiloxanes). The isomeric purity of the poly(aminoalkylmethylsiloxane) fluids, prepared in the manner of the prior art, is dependent upon the isomeric purity of the aminoalkylmethyldialkoxysilane prepared in the first step of the synthesis.

German Patent No. 2408480 describes the reaction of a silazane derivative from allylamine and an organohydrochlorosilane, in the presence of a proton acceptor to form an intermediate silazane which then undergoes a hydrosilylation reaction catalyzed by a platinum catalyst. Upon alcoholysis, the intermediate hydrosilylation product forms 3-aminopropylmethyldiethoxysilane in 70% overall yield. A molar excess of at least 50% of allylamine is used in this process. Identification of the beta-isomer in the product was not made. Japanese Patent No. 10017578 describes another method of synthesis by hydrosilylation of N,N-bis(tri-methylsilyl)allylamine by methyldimethoxysilane. The product of that reaction is then heated with methanol to form 3-aminopropylmethyldimethoxysilane in at least 85% overall yield. The presence of the beta-isomer in the product was not identified. Japanese Patent No. 11209384 describes the use of a rhodium:cyclooctadiene complex as a hydrosilylation catalyst for the addition of methyldiethoxysilane to allylamine to form 3-aminopropylmethyldiethoxy-silane in 78% yield. 2-Aminopropylmethyldiethoxysilane is formed in very low levels in this process not exceeding 0.5%.

U.S. Pat. No. 5,391,675 describes the formation of an aminopropylmethylsiloxy-containing polydimethylsiloxane by barium or strontium hydroxide catalyzed condensation of a silanol terminated polydimethylsiloxane with a 3-aminopropylalkoxysilane with elimination of an alcohol.

High isomeric purity poly(3-aminopropylmethylsiloxane)-poly(dimethylsiloxane) copolymers are not items of commerce, although it is noted that Gelest Reactive Silicones has a catalog which lists aminopropylmethylsiloxane-dimethylsiloxane copolymer but does not mention its method of preparation or its isomeric purity. Mention is also made that N-Methyl- and N,N-Dimethylaminopropylmethylsiloxane and -aminoisobutyl-methylsiloxane containing polydimethylsiloxane copolymers are known in the art.

SUMMARY OF THE INVENTION

The present invention provides near quantitative yields of greater than about 95% isomeric purity of poly(3-aminopropylmethylsiloxane)-poly(dimethylsiloxane) copolymers of the general formulae

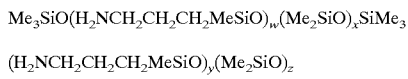

$(H_2NCH_2CH_2CH_2MeSiO)_y(Me_2SiO)_z$ wherein Me is methyl, w may range from 1 to about 100 or more, x may range from 1 to about 100 or more, y may range from 1 to about 6, z may range from 1 to about 6, and y+z may range from 3 to about 7.

The present invention also provides a simple method for rapidly producing poly(3-aminopropylmethylsiloxane)-poly(dimethylsiloxane) copolymers of the general formulae:

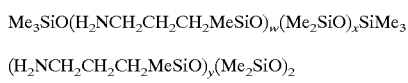

$(H_2NCH_2CH_2CH_2MeSiO)_y(Me_2SiO)_z$ wherein Me is methyl, w may range from 1 to about 100 or more, x may range from 1 to about 100 or more, y may range from 1 to about 6, z may range from 1 to about 6, and y+z may range from 3 to about 7, the method comprising heating of poly(3-aminopropylmethylsiloxane) of at least 95% isomeric purity, with a basic catalyst, and a dimethylcyclosiloxane, such as octamethylcyclotetrasiloxane or decamethlcyclopentasiloxane.

DETAILED DESCRIPTION OF THE PRESENT INVENTION

The present invention provides near quantitative yields of greater than about 95% isometric purity of poly(3-aminopropylmethylsiloxane)-poly(dimethylsiloxane) copolymers of the general formulae:

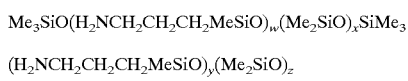

$(H_2NCH_2CH_2CH_2MeSiO)_y(Me_2SiO)_z$ wherein Me is methyl, w may range from 1 to about 100 or more, x may range from 1 to about 100 or more, y may range from 1 to about 6, z may range from 1 to about 6, and y+z may range from 3 to about 7. The present invention also provides high purity poly(3-aminopropylmethylsiloxane)-poly(dimethylsiloxane) copolymers which are greater than about 97% free of dimethylcyclosiloxanes and are substantially free of other organic and inorganic compounds.

The ratio of linear to cyclic polymers in the fluids of the present invention can vary widely, but are typically in the range of from about 1:10 to about 10:1.

The present invention also provides a novel method for producing the high isomeric purity poly(3-aminopropylmethylsiloxane)-poly(dimethylsiloxane) copolymers of the present invention, the process comprising (a) mixing poly(3-aminopropylmethylsiloxane) of at least about 95% isomeric purity, with a cyclodimethylsiloxane of the general formula $(Me_2SiO)_a$ wherein Me is methyl and "a" may range from 3 to about 7, and a basic catalyst, (b) heating the mixture to polymerize the cyclodimethylsiloxane to poly(dimethylsiloxane) and to copolymerize the poly(3-aminopropylmethylsiloxane) with the formed poly (dimethylsiloxane), and (c) decomposing the catalyst and recovering the product copolymer.

The high isomeric purity poly(3-aminopropylmethylsiloxane) is prepared according to the instructions set forth in a co-pending concurrently filed commonly assigned United States patent application by the same inventors Ser. No. 09/532,714.

The dimethylcyclosiloxanes are well known to those of ordinary skill in the art, and are preferably of the formula $$(Me_2SiO)_a$$

wherein Me is methyl and a is from 3 to about 7. Preferred dimethylcyclosiloxanes for use in the practice of the present invention are octamethylcyclotetrasiloxane, decamethylcyclopentasiloxane and mixtures thereof.

The basic catalysts that are known in the art to facilitate copolymerization of cyclodimethylsiloxanes and poly(3-aminoorganomethylsiloxanes) include most metal hydroxides, metal oxides, quaternary organoammonium hydroxides, quaternary organophosphonium hydroxides, and metal trimethylsilanolates. The preferred catalysts are quaternary organoammonium hydroxides, quaternary organophosphonium hydroxides, and metal trimethylsilanolates. A particularly useful catalyst for the based catalyzed polymerization and ring-chain equilibration is tetramethylammonium hydroxide. The catalyst is typically employed in amounts ranging from about 100 ppm to about 10,000 ppm, preferably from about 1000 to about 5000 ppm, and more preferably from about 2000 to about 4000 ppm, based on the weight of the poly(3-aminopropylmethylsiloxane) and cyclodimethyl-siloxane.

The copolymerization can be carried at temperatures ranging from about 50° C. to about 150° C., preferably between about 60° C. and 100° C. and more preferably between 80° C. and 120° C., in the presence of the basic catalyst.

The catalyst may then be decomposed and the decomposition products thereof driven from the copolymer by further heating, such as to a temperature in the range of from about 130° C. to about 160° C.

DESCRIPTION OF THE PREFERRED EMBODIMENTS

The following examples illustrate the present invention. They are not to be construed to limit the scope of the appended claims in any manner whatsoever.

EXAMPLE 1

To a 500 ml round bottom flask equipped with a stirrer, condenser, thermometer, strip head, heating mantle and nitrogen overgas was added 1.6 g (3.5 mmole) of at least about 95% isomerically pure poly(3-aminopropylmethylsiloxane) with an average molecular weight of 420, 209 g (0.7 mole) of octamethylcyclotetrasiloxane, and 1 g (3000 ppm) of tetramethylammonium hydroxide. This mixture was heated to 80° C. and held at that temperature for 10 hours. The temperature of the mixture was then elevated to 145° C., and heated at that temperature for 2 hours to decompose the catalyst with a nitrogen sparge to remove the byproducts. Remaining in the flask was 210 g of poly(3-aminopropylmethylsiloxane)-poly(dimethylsiloxane) copolymer. Gel permeation chromatography analysis of this product identified the presence of 85% linear polysiloxanes and 15% cyclosiloxanes. The copolymer had a viscosity of 2570 cp at 25° C.

EXAMPLE 2

To a 500 ml round bottom flask equipped with a stirrer, condenser, thermometer, strip head, heating mantle and nitrogen overgas was added 5.5 g (14 mmole) of at least about 95% isomerically pure poly(3-aminopropylmethylsiloxane) with an average molecular weight of 420, 107 g (0.36 mole) of octamethylcyclotetrasiloxane, and 0.5 g (3000 ppm) of tetramethylammonium hydroxide. This mixture was heated to 80° C. and held for 10 hours. The temperature of the mixture was then elevated to 145° C., and held for 2 hours at that temperature in order to decompose the catalyst and sparged with nitrogen to remove the by-products. Remaining in the flask was 112 g of poly(3-aminopropylmethylsiloxane)poly(dimethylsiloxane) copolymer. Gel permeation chromatography analysis of this product indicated the presence of 87.5% linear siloxanes and 12.5% cyclosiloxanes. The product had a viscosity of 523 cp at 25° C.

Variations of the present invention will suggest themselves to those skilled in the art in light of the above detailed descriptions. All such obvious modifications are within the full intended scope of the appended claims. It should be understood that the forms of the invention described herein are exemplary only, and are not intended to be limitations on the scope of the present invention which is defined in the appended claims.

What is claimed is:

1. High isomeric purity, poly(3-aminopropylmethylsiloxane)-poly(dimethylsiloxane) copolymer fluids of the general formulae:

$$Me_3SiO(H_2NCH_2CH_2CH_2MeSiO)_w(Me_2SiO)_xSiMe_3$$

$$(H_2NCH_2CH_2CH_2MeSiO)_y(Me_2SiO)_z$$

wherein Me is methyl, w ranges from 1 to about 100, x ranges from 1 to about 100, y ranges from 1 to about 6, z ranges from 1 to about 6 and y+z ranges from 3 to about 7, said fluid being of at least 95% isomeric purity with respect to the position of each primary amino group in the 3 position of the propyl substituents.

2. A composition as defined in claim 1 which is greater than 97% free of dimethylcyclosiloxane and substantially free of organic and inorganic compounds.

3. A composition as defined in claim 1 wherein the ratio of linear polymers of the general formula:

$$Me_3SiO(H_2NCH_2CH_2CH_2MeSiO)_w(Me_2SiO)_xSiMe_3$$

wherein Me is methyl, w ranges from 1 to about 100, and x ranges from 1 to about 100, to cyclic polymers of the general formula:

$$(H_2NCH_2CH_2CH_2MeSiO)_y(Me_2SiO)_z$$

wherein Me is methyl, y ranges from 1 to about 6, z ranges from 1 to about 6 and y+z ranges from 3 to about 7, ranges from about 10:1 to about 1:10.

4. A composition as defined in claim 1 wherein z is 4 or 5.

5. A composition as defined in claim 1 wherein z is 4.

6. A process for the production of high isomeric purity poly(3-aminopropylmethylsiloxane)-poly(dimethylsiloxane) copolymer fluids of the general formulae:

$$Me_3SiO(H_2NCH_2CH_2CH_2MeSiO)_w(Me_2SiO)_xSiMe_3$$

wherein Me is methyl, w ranges from 1 to about 100, x ranges from 1 to about 100, and y ranges from 1 to about 6, z ranges from 1 to about 6, y+z ranges from 3 to about 7, said fluid being of at least 95% isomeric purity with respect to the position of each primary amino group in the 3 position of the propyl substituents, said process comprising the steps of:

(a) mixing a poly(3-aminopropylmethylsiloxane) which is at least about 95% isomerically pure and a cyclodimethylsiloxane of the general formula:

wherein Me is methyl and a may range from 3 to about 7 with a basic catalyst;

(b) heating the mixture to polymerize the cyclodimethylsiloxane to poly (dimethylsiloxane), and to copolymerize the poly(3-aminopropylmethylsiloxane) and the formed poly(dimethylsiloxane) polymers and:

(c) decomposing the catalyst and recovering the product copolymer.

7. A process as defined in claim 1 wherein the basic catalyst is selected from the group consisting of metal hydroxides, metal oxides, quaternary organoammonium hydroxides, quaternary organophosphonium hydroxides, metal trimethyl-silanolates and mixtures of the foregoing.

8. A process as defined in claim 7 wherein the basic catalyst is selected from the group consisting of quaternary organoammonium hydroxides, quaternary organophosphonium hydroxides, metal trimethylsilanolates and mixtures thereof.

9. A process as defined in claim 8 wherein the basic catalyst comprises tetramethylammonium hydroxide.

10. A process as defined in claim 6 wherein the concentration of said basic catalyst, relative to the mixture of poly(3-aminopropylmethylsiloxane) and cyclodimethylsiloxane, ranges from 100 ppm to about 10000 ppm.

11. A process as defined in claim 10 wherein the concentration of said basic catalyst, relative to the mixture of poly(3-aminopropylmethylsiloxane) and cyclodimethylsiloxane, ranges from 1000 ppm to about 5000 ppm.

12. A process as defined in claim 11 wherein the concentration of said basic catalyst, relative to the mixture of poly(3-aminopropylmethylsiloxane) and cyclodimethylsiloxane, ranges from 2000 ppm to about 4000 ppm.

13. A process as defined in claim 6 wherein said cyclodimethylsiloxane is selected from the group consisting of octamethylcyclotetrasiloxane, decamethylcyclopentasiloxane and mixtures of the foregoing.

14. A process as defined in claim 13 wherein said cyclodimethylsiloxane comprises octamethylcyclosiloxane.

15. A process as defined in claim 6 wherein the mixture is heated to a temperature in the range of 60° C. to 100° C. to polymerize said cyclodimethylsiloxane to copolymerize said formed poly(dimethylsiloxane) with said poly(3-aminopropylmethylsiloxane).

16. A process as defined in claim 6 wherein the poly(3-aminopropylmethylsiloxane)-poly(dimethylsiloxane) copolymer is heated to a temperature in the range of 130° C. to 160° C. to decompose the basic catalyst and drive the decomposition products out of said copolymer.

17. A process as defined in claim 16 wherein said process produces a copolymer which is greater than 97% free of dimethylcyclosiloxane and substantially free of organic and inorganic compounds.

18. A copolymer produced by the process as defined in claim 6.

19. A copolymer produced by the process as defined in claim 17.

* * * * *